(12) United States Patent
Saito et al.

(10) Patent No.: US 12,567,608 B2
(45) Date of Patent: Mar. 3, 2026

(54) SYSTEM, PROGRAM, AND MANAGEMENT METHOD

(71) Applicant: SoftBank Corp., Tokyo (JP)

(72) Inventors: Takaya Saito, Tokyo (JP); Yoshiki Takayanagi, Tokyo (JP); Shuntaro Miyakawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 14 days.

(21) Appl. No.: 18/595,428

(22) Filed: Mar. 5, 2024

(65) Prior Publication Data

US 2024/0199217 A1     Jun. 20, 2024

Related U.S. Application Data

(63) Continuation of application No. PCT/JP2022/033195, filed on Sep. 2, 2022.

(30) Foreign Application Priority Data

Sep. 7, 2021    (JP) ................................. 2021-145457

(51) Int. Cl.
| | |
|---|---|
| *B64D 27/40* | (2024.01) |
| *B64D 27/35* | (2024.01) |
| *B64D 27/353* | (2024.01) |
| *B64D 27/357* | (2024.01) |
| *B64D 31/06* | (2024.01) |
| *B64D 35/021* | (2024.01) |

(Continued)

(52) U.S. Cl.
CPC ............. *H01M 10/44* (2013.01); *B64D 27/35* (2024.01); *B64D 27/353* (2024.01); *B64D 27/357* (2024.01); *B64D 35/021* (2024.01); *B64U 50/31* (2023.01)

(58) Field of Classification Search
None
See application file for complete search history.

(56) References Cited

U.S. PATENT DOCUMENTS

2017/0207640 A1* 7/2017 Wang .................... H02J 7/0014
2019/0356157 A1   11/2019 Ohashi
(Continued)

FOREIGN PATENT DOCUMENTS

| | | |
|---|---|---|
| AU | 2019279949 A1 | 9/2020 |
| JP | H09121461 A | 5/1997 |

(Continued)

OTHER PUBLICATIONS

Extended European Search Report for counterpart European Application No. 22867313.3, issued by the European Patent Office on Jan. 3, 2025.

(Continued)

*Primary Examiner* — Rexford N Barnie
*Assistant Examiner* — Aqeel H Bukhari

(57)     ABSTRACT

Provided is a system comprising: a management unit that manages a plurality of battery packs, which are connected in parallel to a bus to which a power generation unit and a load are connected, to have the plurality of battery packs being alternately discharged so that a voltage difference between a battery pack with a highest voltage and a battery pack with a lowest voltage among the plurality of battery packs is not greater than a voltage threshold.

17 Claims, 12 Drawing Sheets

(51) Int. Cl.
    *B64U 50/31*         (2023.01)
    *H01M 10/44*      (2006.01)

(56)            References Cited

U.S. PATENT DOCUMENTS

| | | | |
|---|---|---|---|
| 2020/0044460 A1 | 2/2020 | Mikhaylik | |
| 2020/0274368 A1* | 8/2020 | Crouse, Jr. ............. | B64U 50/19 |
| 2021/0091848 A1 | 3/2021 | Cai | |
| 2021/0171194 A1* | 6/2021 | Lin ........................ | B60L 50/60 |
| 2023/0044238 A1 | 2/2023 | Saito | |
| 2023/0249850 A1* | 8/2023 | Ukumori ............... | B64U 50/31 |
| | | | 244/53 R |

FOREIGN PATENT DOCUMENTS

| | | | |
|---|---|---|---|
| JP | H10334951 | A | 12/1998 |
| JP | 2018186346 | A | 11/2018 |
| JP | 6458891 | B1 | 1/2019 |
| JP | 2019187027 | A | 10/2019 |
| JP | 2020043494 | A | 3/2020 |
| JP | 2021166436 | A | 10/2021 |
| WO | 2018139337 | A1 | 8/2018 |

OTHER PUBLICATIONS

International Search Report and Written Opinion (ISA/237) of the International Search Authority for International Patent Application No. PCT/JP2022/033195, mailed by the Japan Patent Office on Oct. 11, 2022.

\* cited by examiner

10

100

110

MANAGEMENT
UNIT

114

ESTIMATION
UNIT

112

PACK-RELATED
INFORMATION
ACQUIRING
UNIT

SYSTEM, PROGRAM, AND MANAGEMENT METHOD

The contents of the following patent application(s) are incorporated herein by reference:

NO. 2021-145457 filed in JP on Sep. 7, 2021
NO. PCT/JP2022/033195 filed in WO on Sep. 2, 2022

BACKGROUND

1. Technical Field

The present invention relates to a system, a program, and a management method.

2. Related Art

A device that performs various operations by discharging the power of a battery at a relatively low discharge rate such as HAPS (High Altitude Platform Station) is known (for example, see Patent document 1).

PRIOR ART DOCUMENT

Patent Document

Patent document 1: Japanese Patent Application Publication No. 2020-043494

BRIEF DESCRIPTION OF THE DRAWINGS

FIG. 5 schematically shows an example of a functional configuration of the management device 100.

DESCRIPTION OF EXEMPLARY EMBODIMENTS

A battery (in particular, a battery using a lithium metal negative end) has a characteristic that its deterioration is brought early if the discharge rate is low. As one of the solutions, a technology that increases the discharge rate per cell by alternately using cells in a pack is proposed. However, a component for switching is required for switching the cell in the pack, causing a weight increase and high cost of the pack. Also, the battery has a characteristic that the deterioration is brought early if the charge rate is high. The system 10 according to the present embodiment realizes a charging and discharging management of the battery considering such characteristics of the battery.

Hereinafter, the present invention will be described through embodiments of the invention, but the following embodiments do not limit the invention according to claims. In addition, not all of the combinations of features described in the embodiments are essential to the solution of the invention.

Figure 1:
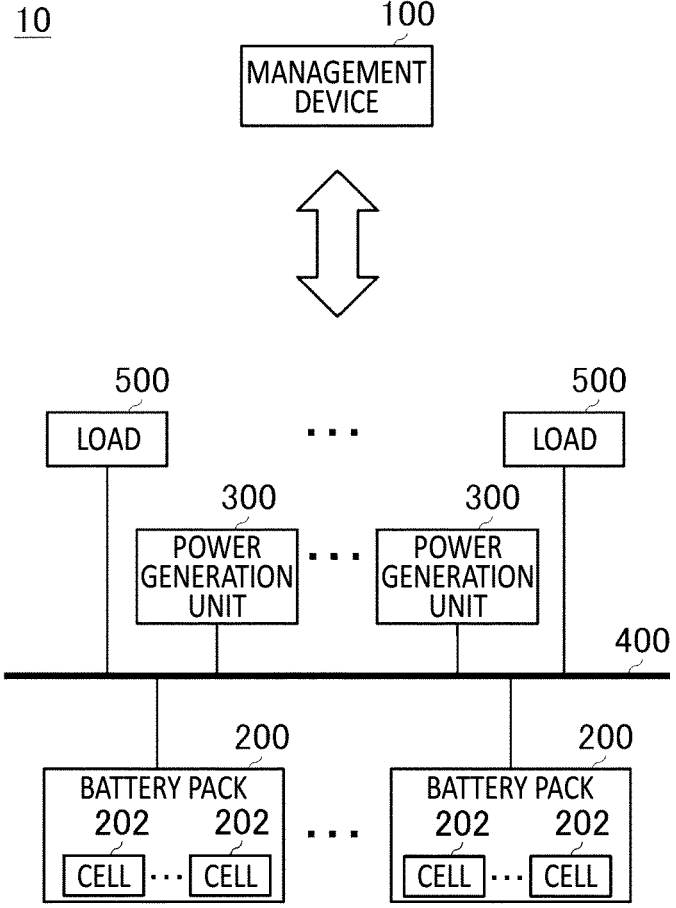
FIG. 1 schematically shows an example of a system 10.

FIG. 1 schematically shows an example of a system 10. The system 10 includes a management device 100. The management device 100 manages a plurality of battery packs 200 which are connected to a bus 400 in parallel to which a plurality of power generation units 300 and a plurality of loads 500 are connected. The management device 100 may manage charging and discharging of the plurality of battery packs 200.

The system 10 may include the plurality of battery packs 200. The system 10 may include the plurality of power generation units 300. The system 10 may include the plurality of loads 500.

A battery type of the battery pack 200 may be any type. The battery pack 200 is a battery using lithium for a negative end, for example. The battery pack 200 is a lithium-ion battery, for example. The battery pack 200 may have a lithium metal battery.

The battery pack 200 includes a plurality of cells 202. The cell 202 may be a battery cell using metallic lithium for a negative end, for example.

The power generation unit 300 performs a solar power generation, for example. A power generation technique according to the power generation unit 300 may be another power generation technique. The battery pack 200 can be charged by power generated by the power generation unit 300. The plurality of power generation units 300 may be connected to the bus 400 in parallel.

The load 500 consumes the power of the battery pack 200 or consumes the power generated by the power generation unit 300. The load 500 may be any device that is operated by electric power. For example, when the system 10 is mounted in a flight vehicle, the load 500 may be a device related to a flight of a flight vehicle such as a propeller or an elevator.

The management device 100 according to the present embodiment manages the charging and discharging of the plurality of battery packs 200 so that a deterioration of the plurality of battery packs 200 is suppressed.

Figure 2:
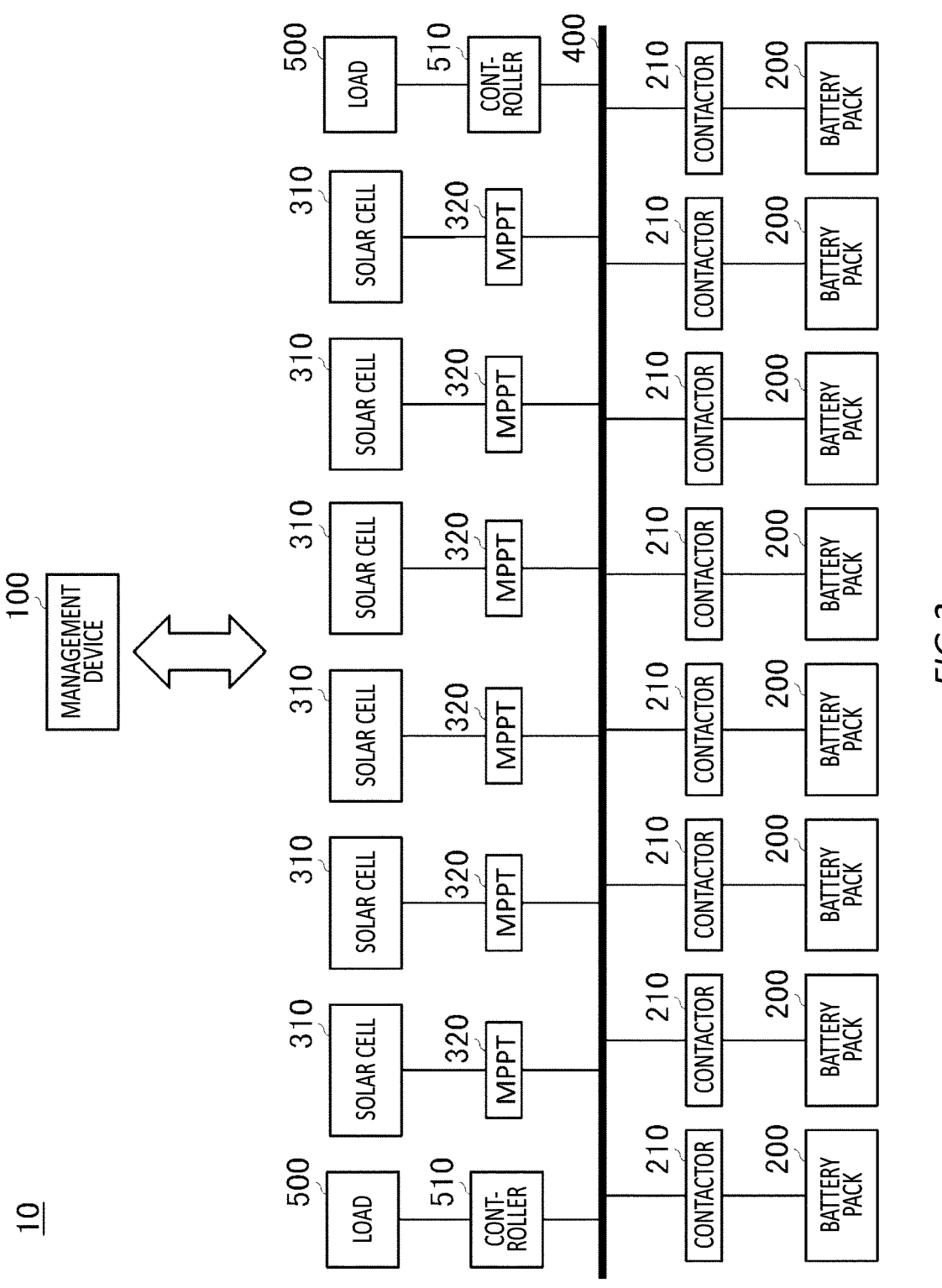
FIG. 2 schematically shows an example of the system 10.

FIG. 2 schematically shows an example of the system 10. In an example shown in FIG. 2, each of the plurality of battery packs 200 is connected to the bus 400 via a contactor 210. Also, a plurality of solar cells 310 are connected to the bus 400 via an MPPT (Maximum Power Point Tracking) 320. The solar cell 310 may be an example of the power generation unit 300. Also, a plurality of loads 500 are connected to the bus 400 via a controller 510. Here, a load 500 on the left side that is arranged on the left side of the bus 400, and a load 500 on the right side that is arranged on the right side of the bus 400 are illustrated.

When the battery packs 200 are separately described, from the left side to the right side, the battery packs may be described as a battery pack A, a battery pack B, a battery pack C, a battery pack D, a battery pack E, a battery pack F, a battery pack G, and a battery pack H. When the contactors 210 are separately described, from the left side to the right side, the contactors may be described as a contactor A, a contactor B, a contactor C, a contactor D, a contactor E, a contactor F, a contactor G, and a contactor H.

Figure 3:
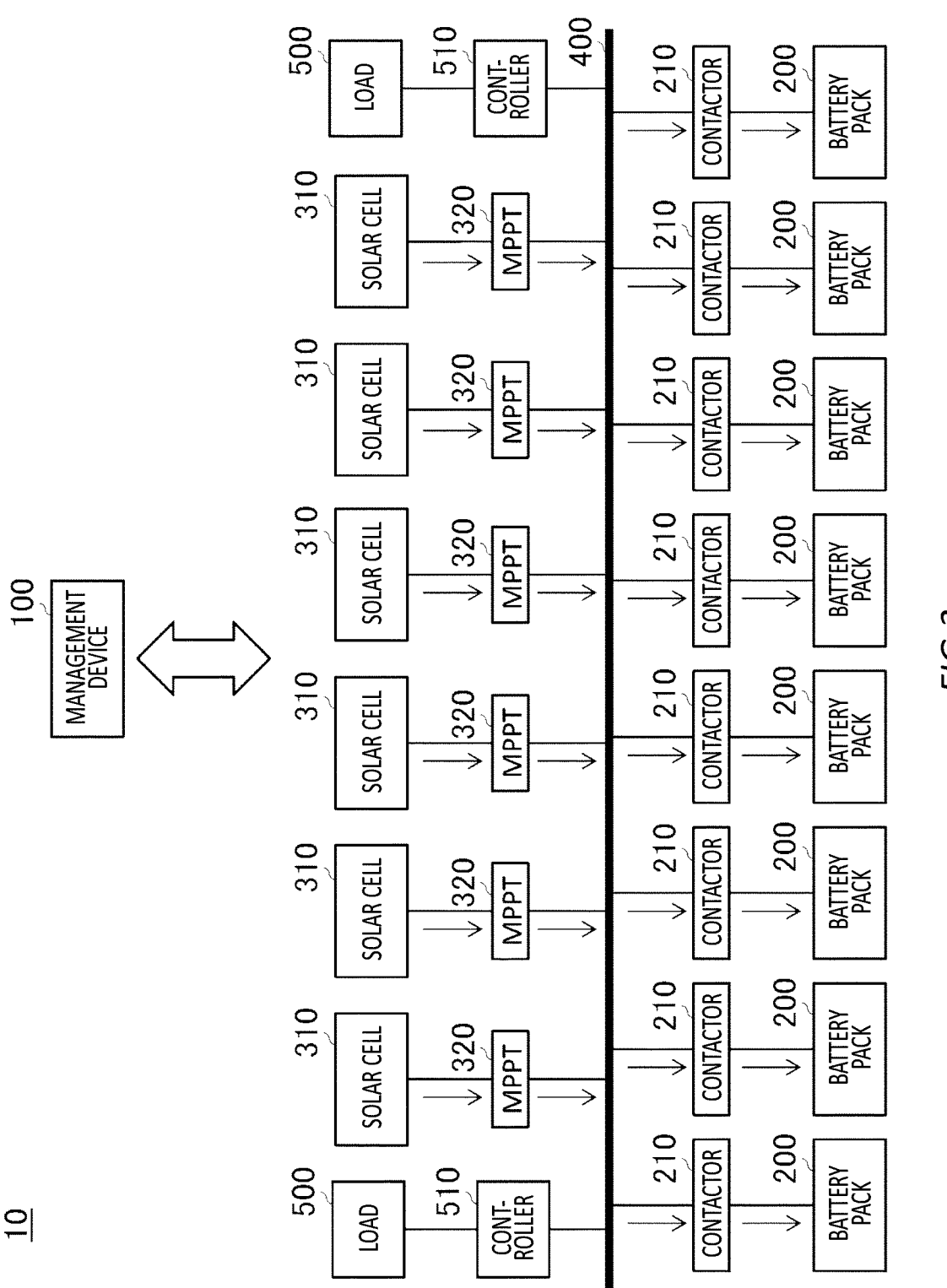
FIG. 3 schematically shows an example of a flow of a current in the system 10 at a time of charging.

FIG. 3 schematically shows an example of a flow of a current in the system 10 at a time of charging. As shown in the example of FIG. 3, the management device 100 may control the electrical connection of the plurality of battery packs 200 to the bus 400 so that the plurality of battery packs 200 are simultaneously charged by power generated by the plurality of solar cells 310. The management device 100 controls the power to be simultaneously supplied for all of the battery packs 200 by opening all of the contactors 210 when a power generation by the plurality of solar cells 310 is started, for example.

Figure 4:
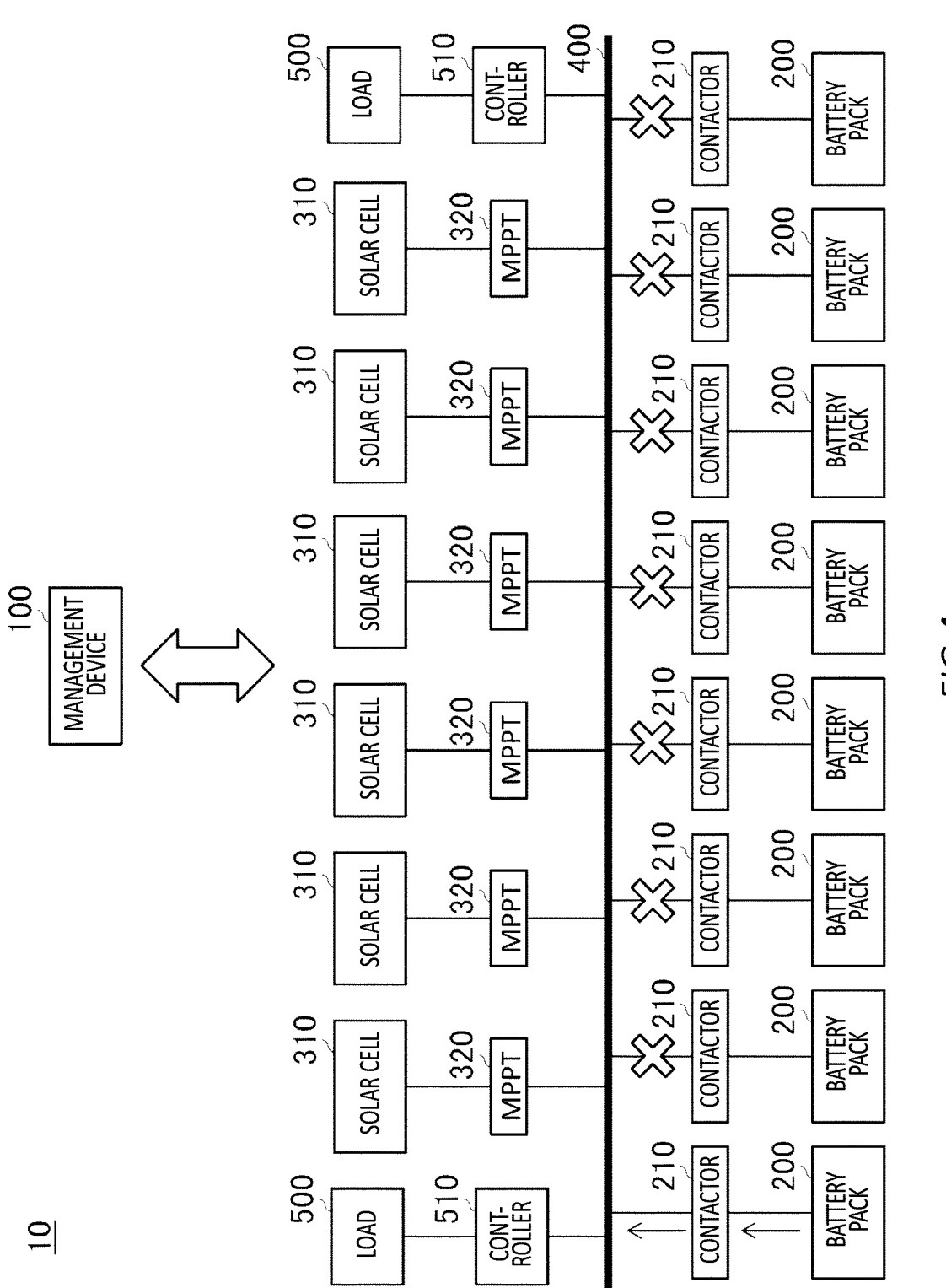
FIG. 4 schematically shows an example of a flow of a current of the system 10 at a time of discharging.

FIG. 4 schematically shows an example of a flow of a current of the system 10 at a time of discharging. The management device 100 may manage the plurality of battery packs 200 to have the plurality of battery packs 200 being alternately discharged so that the discharge rate of each of the plurality of battery packs 200 is higher compared to a case in which all of the plurality of battery packs 200 are discharged.

The management device 100 controls a plurality of contactors 210 so that the plurality of battery packs 200 are sequentially discharged one by one, for example. The management device 100 controls the plurality of contactors 210 so that the battery pack A, the battery pack B, the battery pack C, the battery pack D, the battery pack E, the battery pack F, the battery pack G, and the battery pack H are repeatedly discharged in the above order, for example. Also, the management device 100 controls the plurality of contactors 210 so that a battery pack 200 with a higher voltage is sequentially discharged with a higher priority, among the plurality of battery packs 200, for example. In this manner, by causing eight battery packs 200 to be alternately discharged, the discharge rate of the battery pack 200 can be eight times compared to a case in which all of the eight battery packs 200 are discharged.

Although the management device 100 accordingly switches the charge and the discharge for the plurality of battery packs 200, when all of the plurality of contactors 210 are opened for the charge, if a voltage difference between a battery pack 200 with a highest voltage and a battery pack 200 with a lowest voltage among the plurality of battery packs 200 is large, for example, the charge rate of the latter one may be accelerated due to a current flowing from the former one to the latter one, causing the deterioration of the latter one to be accelerated.

The management device 100 according to the present embodiment manages the plurality of battery packs 200 to have the plurality of battery packs 200 being alternately discharged so that a voltage difference between a battery pack 200 with a highest voltage and a battery pack 200 with a lowest voltage among the plurality of battery packs 200 is not greater than a predetermined voltage threshold. In other words, the management device 100 manages plurality of battery packs 200 to have the plurality of battery packs 200 being alternately discharged so that a remaining capacity difference between a battery pack 200 whose remaining capacity is maximum and a battery pack 200 whose remaining capacity is minimum among the plurality of battery packs 200 is not greater than a predetermined remaining capacity threshold.

For example, the management device 100 first starts discharging of the battery pack 200 with a highest voltage (may be described as a first battery pack 200) among the plurality of battery packs 200. The management device 100 starts discharging of the second battery pack 200 before a difference between the voltage of the first battery pack 200 and a battery pack 200 with a highest voltage among another plurality of battery packs 200 (may be described as a second battery pack 200) among the plurality of battery packs 200 becomes greater than a voltage threshold. The management device 100 stops the discharging of the first battery pack 200 after a predetermined amount of time has elapsed from the start of the discharging of the second battery pack 200. By repeating such a control, the voltage difference between the battery pack 200 with a highest voltage and the battery pack 200 with a lowest voltage among the plurality of battery packs 200 can be caused not to be greater than a predetermined voltage threshold. Note that the predetermined amount of time may be around 0.01-1 second, for example. By causing the discharging of the first battery pack 200 to be stopped after a predetermined amount of time has elapsed from the start of the discharging of the second battery pack 200, the discharge can be done with no interruption.

Figure 5:
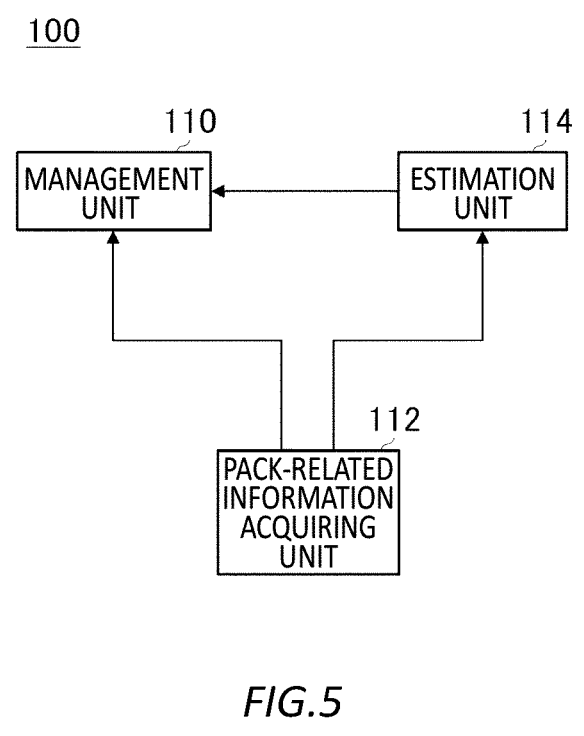

FIG. 5 schematically shows an example of a functional configuration of the management device 100. The management device 100 may include a management unit 110, a pack-related information acquiring unit 112, and an estimation unit 114.

The management unit 110 manages the plurality of battery packs 200 to have the plurality of battery packs 200 being alternately discharged so that a voltage difference between a battery pack 200 with a highest voltage and a battery pack 200 with a lowest voltage among the plurality of battery packs 200 is not greater than a predetermined voltage threshold.

For example, the management unit 110 first starts discharging of the battery pack 200 with a highest voltage (may be described as a first battery pack 200) among the plurality of battery packs 200. Then, the management unit 110 starts discharging of the second battery pack 200 before a difference between the voltage of the first battery pack 200 and a battery pack 200 with a highest voltage among another plurality of battery packs 200 (may be described as a second battery pack 200) among the plurality of battery packs 200 becomes greater than a predetermined voltage threshold. Furthermore, the management unit 110 stops the discharging of the first battery pack 200 after a predetermined amount of time has elapsed from the start of the discharging of the second battery pack 200. The management unit 110 causes the plurality of battery packs 200 to be sequentially discharged by repeating such a control.

The management unit 110 may control the electrical connection of the plurality of battery packs 200 to the bus 400 so that the plurality of battery packs 200 are simultaneously charged by power generated by the plurality of solar cells 310. For example, the management unit 110 opens all of the plurality of contactors 210 so that the plurality of battery packs 200 are simultaneously charged by the power generated by the plurality of solar cells 310.

When the plurality of battery packs 200 are charged by the power generated by the plurality of solar cells 310, the management unit 110 may manage voltage from the solar cell 310 to the bus 400 to fall within a range between voltage of the battery pack 200 with a highest voltage and voltage of the battery pack 200 with a lowest voltage among the plurality of battery packs 200. The management unit 110 may manage, by controlling a plurality of MPPTs 320, the voltage from the solar cell 310 to the bus 400 to fall within a range between voltage of the battery pack 200 with a highest voltage and voltage of the battery pack 200 with a lowest voltage among the plurality of battery packs 200.

The pack-related information acquiring unit 112 acquires pack-related information related to the battery pack 200 for each of the plurality of battery packs 200. For example, the pack-related information acquiring unit 112 acquires information detected by a sensor that is arranged for each of the plurality of battery packs 200, as pack-related information, from the sensor.

The pack-related information may include an OCV (Open Circuit Voltage) of the battery pack 200. The pack-related information may include a CCV (Closed Circuit Voltage) of the battery pack 200. The pack-related information may include a DCIR (Direct Current Internal Resistance) of the battery pack 200. The pack-related information may include an SOH (State of Health) of the battery pack 200. The pack-related information may include an SOC (State Of Charge) of the battery pack 200. The pack-related information may include a current value of the battery pack 200. The pack-related information may include a discharge duration of the battery pack 200. The pack-related information may include an integrated capacity of the battery pack 200. The pack-related information may include a temperature of the battery pack 200.

The estimation unit 114 estimates a state of the battery pack 200 based on the pack-related information acquired by the pack-related information acquiring unit 112. The estimation unit 114 may perform estimation by using an estimation method that is used in the existing BMS (Battery Management System).

For example, the estimation unit 114 stores a relationship between the SOC and the DCIR of the battery pack 200 to estimate the OCV of the battery pack 200 based on the DCIR, the SOH, the current value, the discharge duration, the CCV, and the integrated capacity that are stored.

Furthermore, for example, the estimation unit 114 first estimates an SOC and an SOH before starting the discharge based on an OCV, a current value, a discharge duration, a CCV, an integrated capacity, and the temperature before starting the discharge. Then, the estimation unit 114 uses the data to estimate a current DCIR based on the database that is previously stored. Furthermore, the estimation unit 114 estimates a current OCV based on the current DCIR, the CCV, and the current value that are estimated.

The management unit 110 may manage, based on the OCV of each of the plurality of battery packs 200 that is acquired by the pack-related information acquiring unit 112, the plurality of battery packs 200 to have the plurality of battery packs 200 to be alternately discharged so that a voltage difference between a battery pack 200 with a highest voltage and a battery pack 200 with a lowest voltage among the plurality of battery packs 200 is not greater than a predetermined voltage threshold.

Furthermore, the management unit 110 may manage, based on the OCV of each of the plurality of battery packs 200 that is estimated by the estimation unit 114, the plurality of battery packs 200 to have the plurality of battery packs 200 to be alternately discharged so that a voltage difference between a battery pack 200 with a highest voltage and a battery pack 200 with a lowest voltage among the plurality of battery packs 200 is not greater than a predetermined voltage threshold.

The management unit 110 may preset a voltage threshold so that a charge rate from the battery pack 200 with a highest voltage to the battery pack 200 with a lowest voltage is not faster than a predetermined charge rate threshold. The charge rate threshold may be 0.3C or less, or more desirably, may be 0.2C or less, for example.

For example, when a battery pack 200 with a DICR of 1.87Ω minimum, 1.99Ω average, and 270-396V of voltage is used with 5 kWh (15 Ah), for setting the DCIR to 2Ω and the charge rate threshold to be 0.2C of 3 A by charging, a voltage difference between the battery pack 200 with a highest voltage and the battery pack 200 with a lowest voltage<(0.2 (C)×15 (Ah)×2 (Ω)=6V), and the voltage threshold is 6V. In this case, the management unit 110 starts the discharge of a battery pack 200 with a highest voltage (described as a first battery pack 200), then starts the discharge of a second battery pack 200 and then stops the discharge of the first battery pack 200 after a predetermined amount of time has elapsed before the voltage of the first battery pack 200 decreases to be lower than the voltage of a battery pack 200 whose voltage is the second highest (described as the second battery pack 200) by 6V or more.

Also, for setting to 0.3C, the voltage difference between the battery pack 200 with a highest voltage and the battery pack 200 with a lowest voltage<(0.3 (C)×15 (Ah)×2 (Ω)=9V), and the voltage threshold is 9V. In this case, the management unit 110 starts the discharge of the first battery pack 200, then starts the discharge of a second battery pack 200 and then stops the discharge of the first battery pack 200 after a predetermined amount of time has elapsed, before the voltage of the first battery pack 200 decreases to be lower than the voltage of the second battery pack 200 by 9V or more.

When an excess power generation amount exists due to a power generation amount increased by the solar cell 310, for example, the management unit 110 may manage the solar cell 310 to consume the generated power so that a charge rate at which the plurality of battery packs 200 are charged is not faster than the charge rate threshold. For example, the management unit 110 controls the controller 510 to cause the load 500 to consume the power generated by the solar cell 310 so that a charge rate at which the plurality of battery packs 200 is charged by the power generated by the solar cell 310 is not faster than the charge rate threshold.

When a discharge rate of the battery pack 200 that is discharging among the plurality of battery packs 200 continues to be slower than a predetermined discharge rate threshold for a predetermined amount of time, the management unit 110 may manage a power consumption of a battery pack 200 that is discharging to be increased. For example, the management unit 110 controls the controller 510 to cause the load 500 to consume the power of the battery pack 200. The predetermined amount of time may be arbitrarily set by seconds or minutes. In this way, early deterioration of the battery pack 200 due to the low discharge rate continuing for a long time can be prevented. The discharge rate threshold may be 0.3C-2.0C, or more desirably, may be 0.4C-1.0C.

The following table 1 shows an experimental result obtained by experimenting a deterioration degree for each of various discharge rates and charge rates of the battery pack 200 that has a battery cell using metallic lithium for a negative end. The experiment is performed multiple times for each combination of the discharge rate and the charge rate, in which a case where 80% of an initial capacity is maintained for an average of 250 cycles or more is "@", a case where 80% of the initial capacity is maintained for an average of 200 cycles or more and less than 250 cycles is "○", and a case where an average of 180 cycles or less is "x". The experiment result shows that, as a result of repeating discharging at a discharge rate of 0.3C and charging at a charge rate of 0.1C for each of the plurality of battery packs 200, 80% of the initial capacity is maintained for an average of 200 cycles or more and less than 250 cycles, for example. Also, the experiment result shows that, as a result of repeating discharging at a discharge rate of 0.5C and charging at a charge rate of 0.2C for each of the plurality of battery packs 200, 80% of the initial capacity is maintained, so the average was 250 cycles or more, for example.

TABLE 1

| | | DISCHARGE RATE | | | | | | | | | |
|---|---|---|---|---|---|---|---|---|---|---|---|
| | | 0.05 | 0.1 | 0.2 | 0.3 | 0.4 | 0.5 | 0.7 | 1 | 2 | 3 |
| CHARGE | 0.05 | X | X | X | ○ | ◎ | ◎ | ◎ | ◎ | ○ | X |
| RATE | 0.1 | X | X | X | ○ | ◎ | ◎ | ◎ | ◎ | ○ | X |
| | 0.2 | X | X | X | ○ | ○ | ◎ | ◎ | ◎ | ○ | X |
| | 0.3 | X | X | X | X | ○ | ○ | ◎ | ◎ | X | X |
| | 0.4 | X | X | X | X | X | X | X | X | X | X |
| | 0.5 | X | X | X | X | X | X | X | X | X | X |
| | 0.7 | X | X | X | X | X | X | X | X | X | X |
| | 1 | X | X | X | X | X | X | X | X | X | X |

As shown in table 1, the discharge rate is desirably 0.3-2.0C, and more desirably, 0.4C-1.0C. The charge rate is desirably 0.3C or less, and more desirably 0.2C or less.

Figure 6:
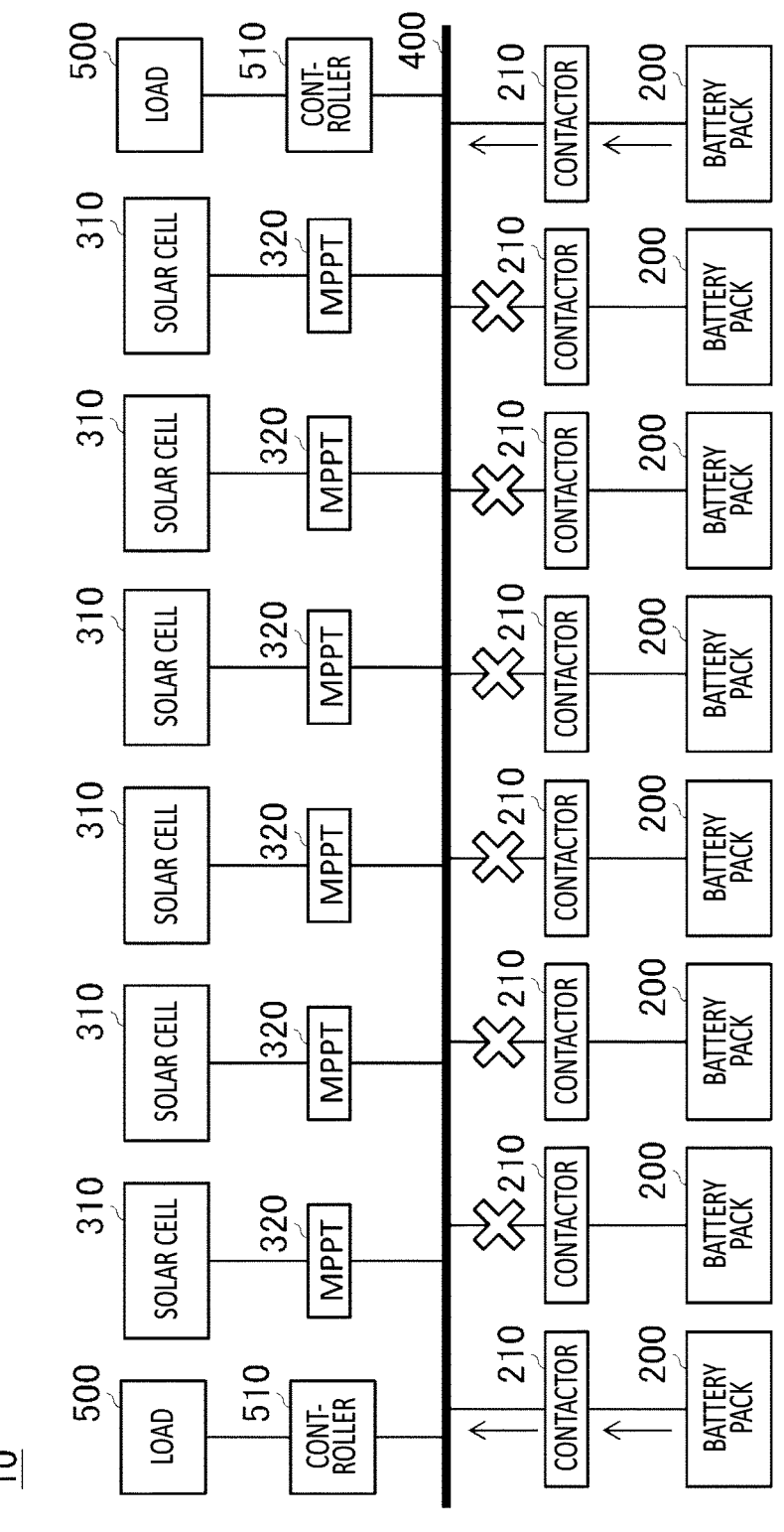
FIG. 6 schematically shows another example of a flow of a current of the system 10 at a time of discharging.

FIG. 6 schematically shows another example of a flow of a current of the system 10 at a time of discharging. The management unit 110 may manage the plurality of battery packs 200 to be sequentially discharged as a set of two or more. For example, the management unit 110 manages the plurality of battery packs 200 to be sequentially discharged two by two. Also, for example, the management unit 110 manages the plurality of battery packs 200 to be sequentially discharged three by three. Also, for example, the management unit 110 manages the plurality of battery packs 200 to be sequentially discharged four by four. These are examples, and the management unit 110 may manage the plurality of battery packs 200 to be sequentially discharged by a larger number than described above.

FIG. 6 illustrates a case where the plurality of battery packs 200 includes four left side battery packs and four right side battery packs arranged in a horizontally symmetrical manner and the management unit 110 manages the plurality of battery packs 200 so that each of the plurality of battery packs on the left side 200 and the plurality of battery packs on the right side 200 is sequentially discharged one by one in a horizontally symmetrical manner. The management unit 110 may control the plurality of contactors 210 so that each of the plurality of battery packs on the left side 200 and the plurality of battery packs on the right side 200 is sequentially discharged one by one in a horizontally symmetrical manner.

For example, the management unit 110 controls the plurality of contactors 210 so that the plurality of battery packs are sequentially discharged in the following order: the first battery pack 200 and the eighth battery pack 200; the second battery pack 200 and the seventh battery pack 200; the third battery pack 200 and the sixth battery pack 200; and the fourth battery pack 200 and the fifth battery pack 200. For example, when the first battery pack 200 and the second battery pack 200 are caused to perform the discharge, the length of a power transmission path to the load 500 on the left side decreases, but a power transmission path to the load 500 on the right side increases, leading to poor power transmission efficiency. On the contrary, the horizontally symmetrical discharge can prevent the length of the power transmission path for one of the load 500 on the left side and the load 500 on the right side from increasing, and can suppress decline in the power transmission efficiency. Note that in this case, when the first battery pack 200 and the eighth battery pack 200 are discharged, the management unit 110 may cause the first battery pack 200 and the eighth battery pack 200 to be simultaneously discharged, alternately discharged, or sequentially discharged.

The management unit 110 may manage a pair of the first battery pack 200 and the eighth battery pack 200, a pair of the second battery pack 200 and the seventh battery pack 200, a pair of the third battery pack 200 and the sixth battery pack 200, and a pair of the fourth battery pack 200 and the fifth battery pack 200 to be preferentially discharged from a pair with a higher voltage. For example, the management unit 110 specifies a battery pack 200 with a higher voltage for each of the plurality of pairs, and causes the specified pair of the battery pack 200 with higher voltage to be preferentially discharged. Also, for example, the management unit 110 causes the pair with higher voltage in average among the plurality of pairs to be preferentially discharged.

The management unit 110 specifies, for example, a battery pack 200 with a higher voltage for each of the plurality of pairs, and determines the order of the pairs sequentially from the highest voltage. Furthermore, the management unit 110 causes the plurality of pairs to be discharged while switching the pairs appropriately according to the determined order so that a voltage difference between the battery pack 200 with a highest voltage and the battery pack 200 with a lowest voltage among the plurality of battery packs 200 is not greater than a voltage threshold.

Also, the management unit 110 may manage the plurality of battery packs 200 to be sequentially discharged for each combination formed of any battery pack from each of the plurality of battery packs on the left side 200 and the plurality of battery packs on the right side 200. For example, the management unit 110 manages the plurality of battery packs 200 so as to be sequentially discharged for each combination, the combination includes a combination of the first battery pack 200 with any of the fifth battery pack 200 to the eighth battery pack 200, a combination of the second battery pack 200 with any of the remaining three of the fifth battery pack 200 to the eighth battery pack 200, a combination of the third battery pack 200 with any of the remaining two of the fifth battery pack 200 to the eighth battery pack 200, and a combination of the fourth battery pack 200 with the remaining battery pack 200 among the fifth battery pack 200 to the eighth battery pack 200.

Figure 7:
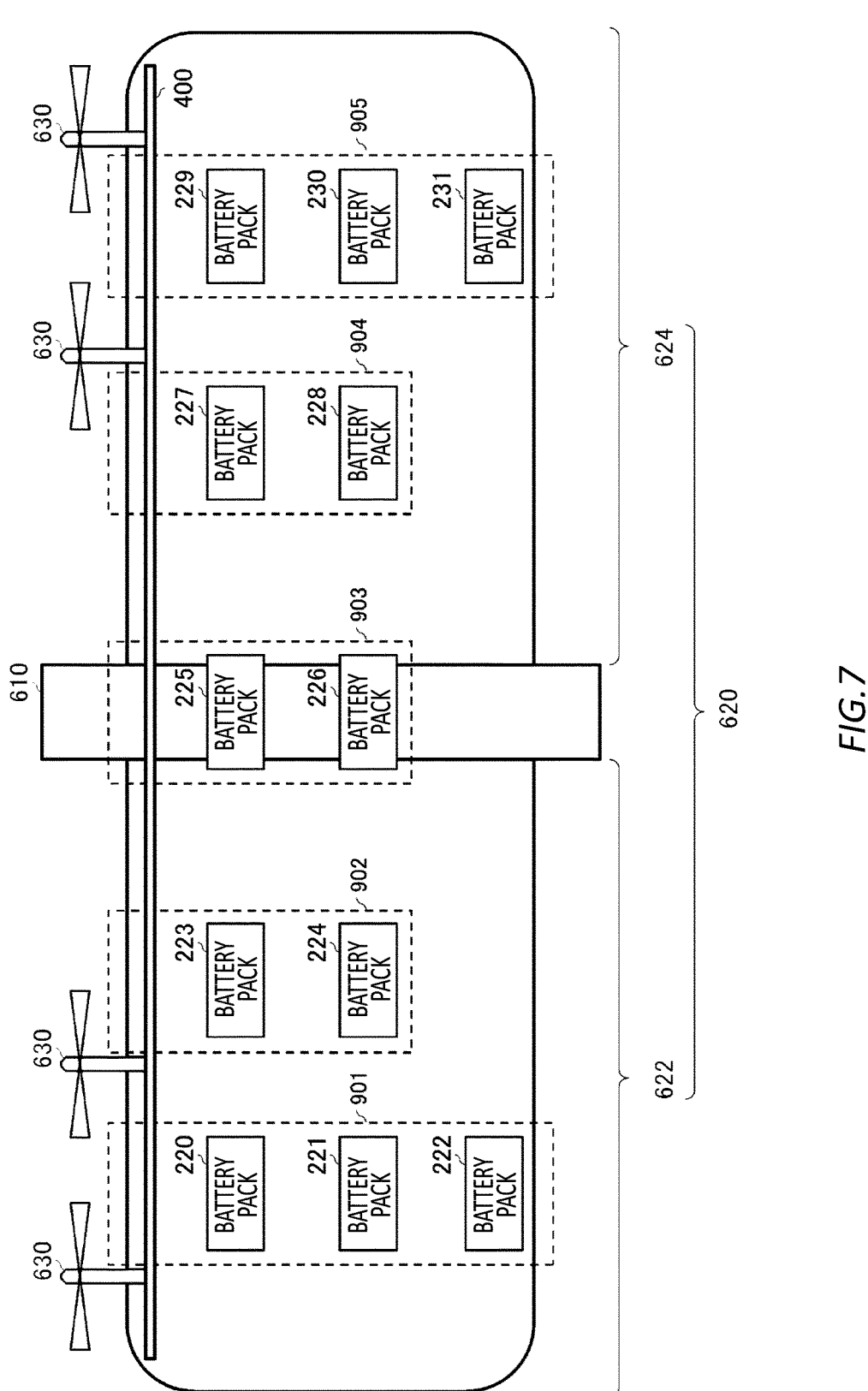
FIG. 7 schematically shows an example of airplane 600 to which the system 10 is mounted thereto.

FIG. 7 schematically shows an example of airplane 600 to which the system 10 is mounted thereto. The airplane 600 may be an example of a flight vehicle. In FIG. 7, a battery pack 220 to a battery pack 231 are illustrated as an example of the plurality of battery packs 200. In the example shown in FIG. 7, the battery pack 220 to the battery pack 224 are arranged in a left-wing portion 622 of a wing portion 620, the battery pack 225 and the battery pack 226 are arranged in an aircraft body 610, and the battery pack 227 to the battery pack 231 are arranged in a right-wing portion 624 of a wing portion 620.

In FIG. 7, an illustration of a wiring from the management device 100, the plurality of contactors 210, the plurality of power generation units 300, and the battery pack 220 to the bus 400 of the battery pack 231 is omitted. The management device 100 is arranged in the aircraft body 610 of the airplane 600, for example. The power generation unit 300 is arranged on an upper surface of the wing portion 620, for example. The battery pack 220 to the battery pack 231 are connected to the bus 400 in parallel. A propeller 630 is an example of the load 500.

Here, an order when the management unit 110 causes the plurality of battery packs 200 to be sequentially discharged two by two is described. The management unit 110 may repeat an order of selecting one by one from each of a group 901 and a group 905 arranged in a horizontally symmetrical manner to cause them to be discharged, selecting one by one from each of a group 902 and a group 904 to cause them to be discharged, and selecting two from a group 903 to cause them to be discharged. The order of selecting one by one from each of two groups arranged in a horizontally symmetrical manner may be selected to match the front-back direction or selected with no matching of the front-back direction. For example, in the former case, the management unit 110 causes the battery pack 220 and the battery pack 229, the battery pack 221 and the battery pack 230, and the battery pack 222 and the battery pack 231 to be sequentially discharged, causes the battery pack 223 and the battery pack 227, and the battery pack 224 and the battery pack 228 to be sequentially discharged, and then causes the battery pack 225 and the battery pack 226 to be discharged.

Figure 8:
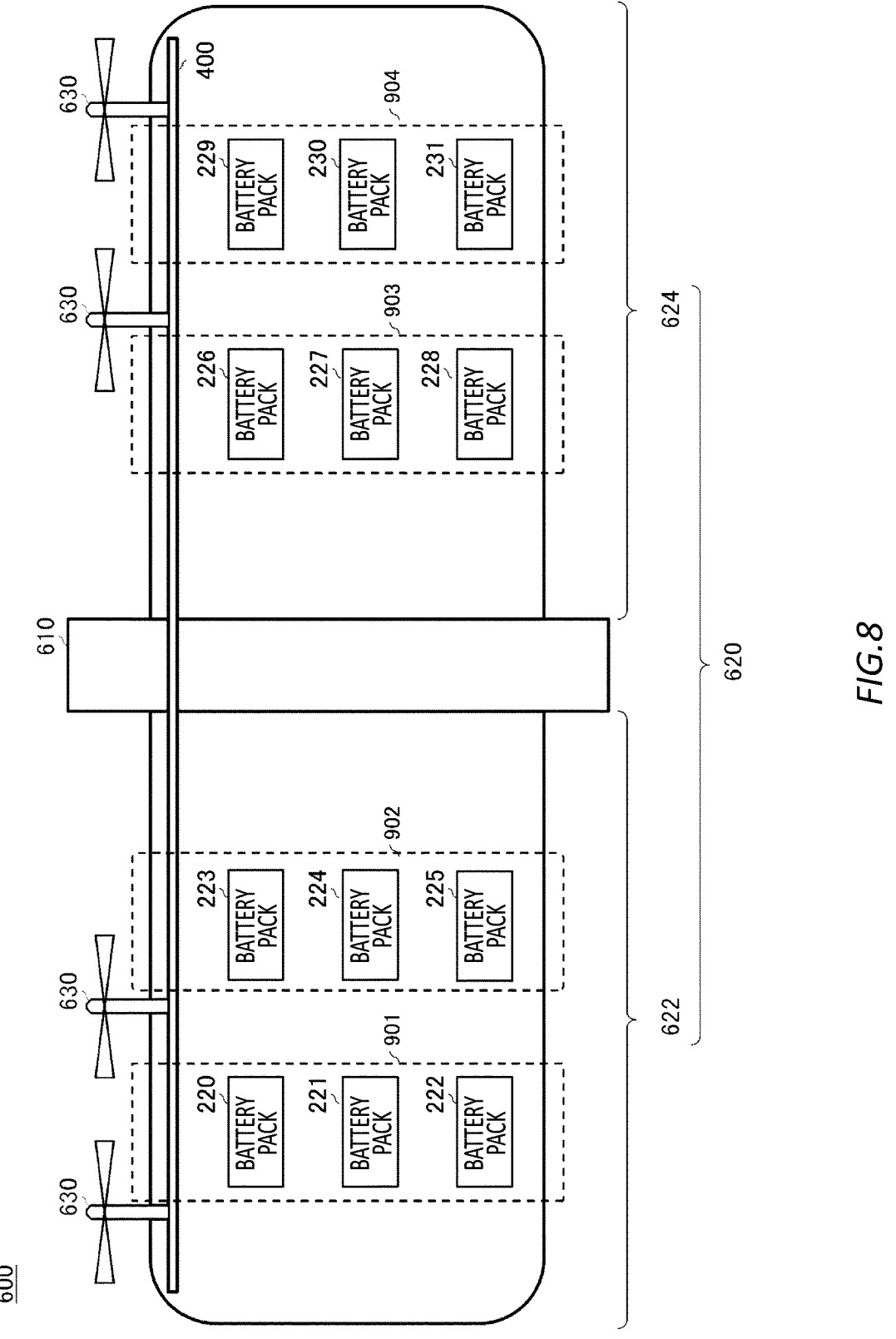
FIG. 8 schematically shows another example of the airplane 600 to which the system 10 is mounted thereto.

FIG. 8 schematically shows another example of the airplane 600 to which the system 10 is mounted thereto. Here, differences from FIG. 7 will be mainly described. In the example shown in FIG. 8, the battery pack 220 to the battery pack 225 are arranged in a left-wing portion 622 of a wing portion 620, and the battery pack 226 to the battery pack 231 are arranged in a right-wing portion 624 of a wing portion 620.

The management unit 110 may repeat an order of selecting one by one from each of a group 901 and a group 904 arranged in a horizontally symmetrical manner to cause them to be discharged, and selecting one by one from each of a group 902 and a group 903 to cause them to be discharged. The order of selecting one by one from each of two groups arranged in a horizontally symmetrical manner may be selected to match the front-back direction or selected with no matching of the front-back direction. For example, in the former case, the management unit 110 causes the battery pack 220 and the battery pack 229, the battery pack 221 and the battery pack 230, and the battery pack 222 and the battery pack 231 to be sequentially discharged, causes the battery pack 223 and the battery pack 226, the battery pack 224 and the battery pack 227, and the battery pack 225 and the battery pack 228 to be sequentially discharged.

Figure 9:
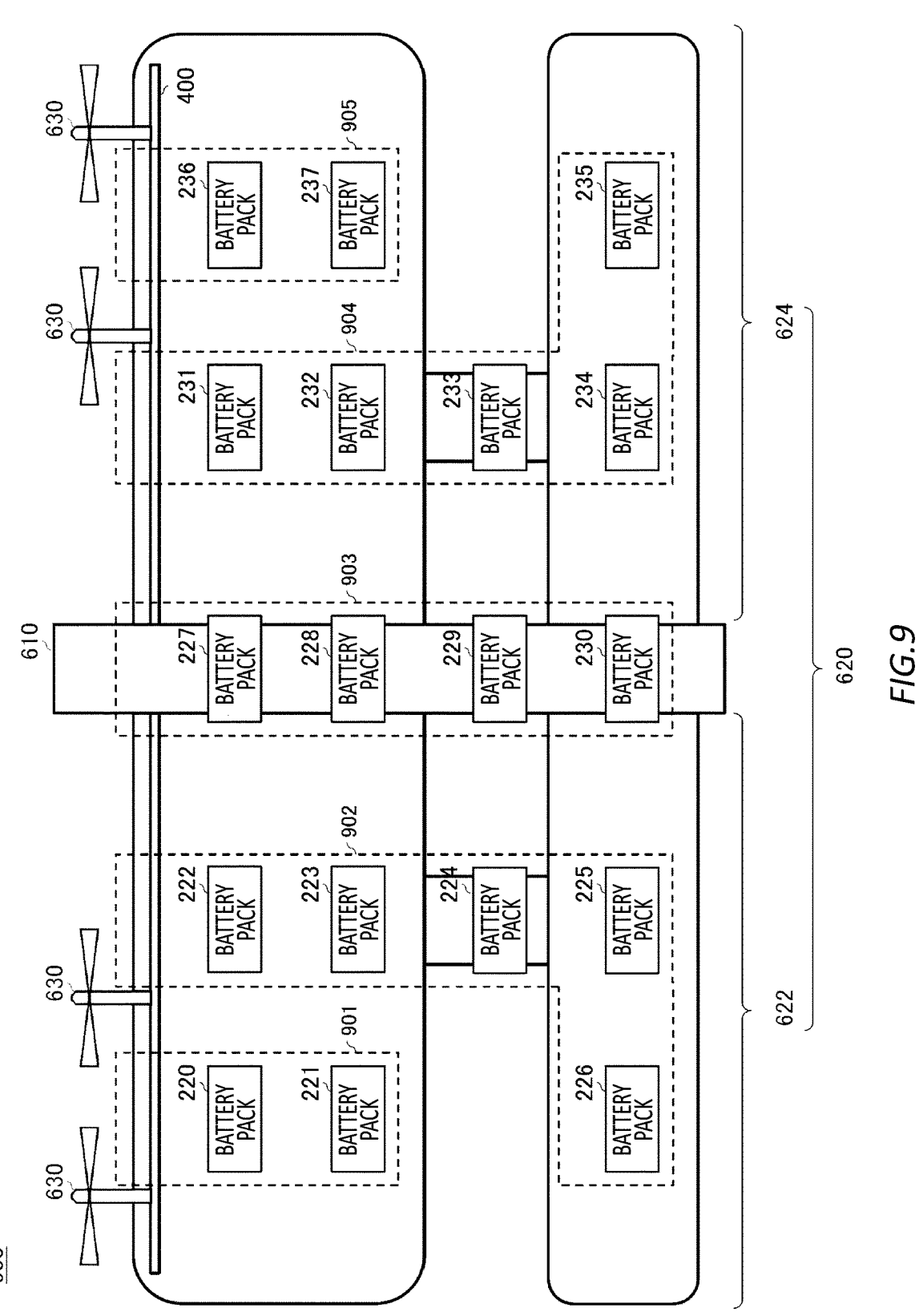
FIG. 9 schematically shows another example of the airplane 600 to which the system 10 is mounted thereto.

FIG. 9 schematically shows another example of the airplane 600 to which the system 10 is mounted thereto. Here, differences from FIG. 7 will be mainly described. In the example shown in FIG. 9, the battery pack 220 to the battery pack 226 are arranged on the left side of the airplane 600, the battery pack 227 to 240 are arranged at the center portion of the airplane 600, and the battery pack 231 to the battery pack 237 are arranged on the right side of the airplane 600.

The management unit 110 may repeat an order of selecting one by one from each of a group 901 and a group 905 arranged in a horizontally symmetrical manner to cause them to be discharged, selecting one by one from each of a group 902 and a group 904 to cause them to be discharged, and selecting two by two from a group 903 to cause them to be discharged. The order of selecting one by one from each of two groups arranged in a horizontally symmetrical manner may be selected to match the front-back direction or selected with no matching of the front-back direction. For example, in the former case, the management unit 110 causes battery pack 220 and the battery pack 236, the battery pack 221 and the battery pack 237 to be sequentially discharged, causes the battery pack 222 and the battery pack 231, the battery pack 223 and the battery pack 232, the battery pack 224 and the battery pack 233, the battery pack 225 and the battery pack 234, and the battery pack 226 and the battery pack 235 to be sequentially discharged, and causes the battery pack 227 and the battery pack 228, and the battery pack 229 and the battery pack 230 to be sequentially discharged.

Figure 10:
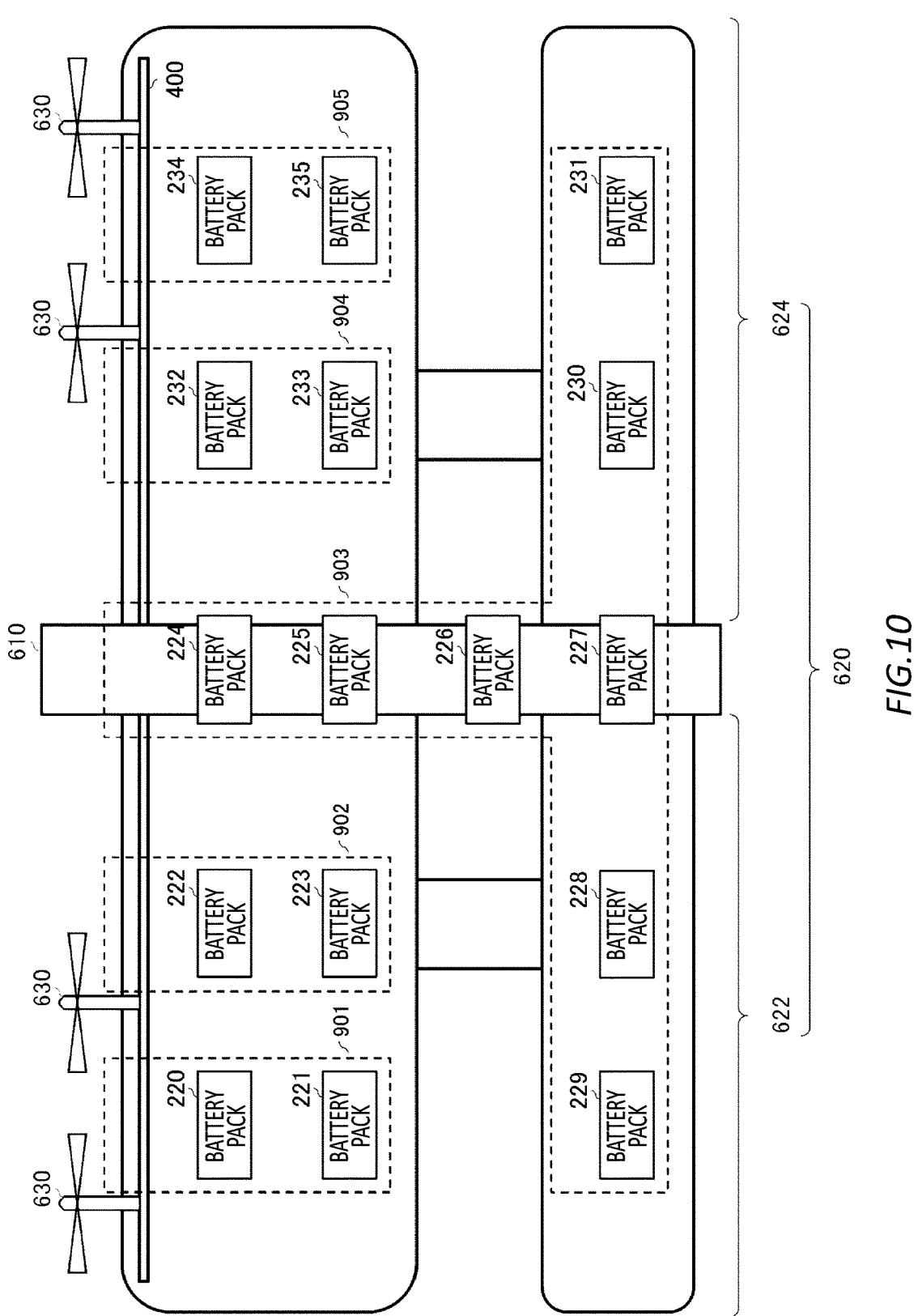
FIG. 10 schematically shows another example of the airplane 600 to which the system 10 is mounted thereto.

FIG. 10 schematically shows another example of the airplane 600 to which the system 10 is mounted thereto. Here, differences from FIG. 7 will be mainly described. In the example shown in FIG. 10, the battery pack 220 to the battery pack 223, the battery pack 228 and the battery pack 229 are arranged in the left-wing portion 622 of the wing portion 620, the battery pack 224 to the battery pack 227 are arranged at the center portion of the airplane 600, and the battery pack 230 to the battery pack 235 are arranged in the right-wing portion 624 of the wing portion 620.

The management unit 110 may repeat an order of selecting one by one from each of a group 901 and a group 905 arranged in a horizontally symmetrical manner to cause them to be discharged, selecting one by one from each of a group 902 and a group 904 to cause them to be discharged, and selecting two by two from a group 903 to cause them to be discharged. The order of selecting one by one from each of two groups arranged in a horizontally symmetrical manner may be selected to match the front-back direction or selected with no matching of the front-back direction. For example, in the former case, the management unit 110 causes battery pack 220 and the battery pack 234, the battery pack 221 and the battery pack 235 to be sequentially discharged, causes the battery pack 222 and the battery pack 232, the battery pack 223 and the battery pack 233 to be sequentially discharged, the battery pack 229 and the battery pack 231, the battery pack 228 and the battery pack 230, the battery pack 226 and the battery pack 227, and the battery pack 224 and the battery pack 225 to be sequentially discharged.

Figure 11:
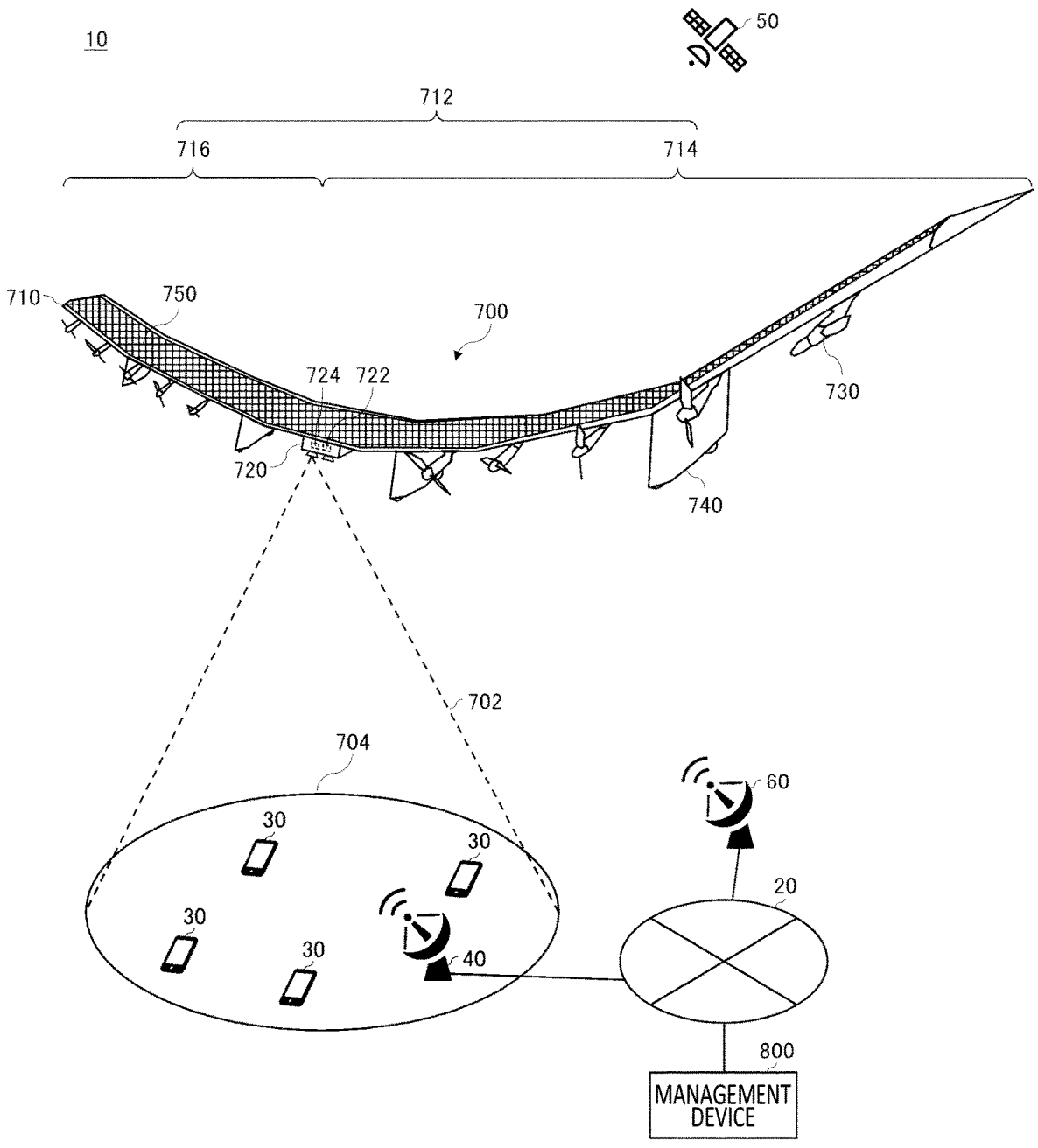
FIG. 11 schematically shows an example of an HAPS 700 to which the system 10 is mounted thereto.

FIG. 11 schematically shows an example of an HAPS 700 to which the system 10 is mounted thereto. The HAPS 700 is a flight vehicle that provides a wireless communication service to a user terminal 30 in a communication area 704 that is formed by irradiating a beam 702 to the ground.

The HAPS 700 includes an aircraft body 710, a central part 720, a propeller 730, a pod 740, and a solar panel 750. The aircraft body 710 has a wing portion 712. The wing portion 712 includes a left-wing portion 714 and a right-wing portion 716.

Inside the wing portion 712, a plurality of battery packs 200 which are connected in parallel are arranged. Among the plurality of battery packs 200, a plurality of battery packs 200 on the left side may be arranged in the left-wing portion 714, and a plurality of battery packs 200 on the right side may be arranged in the right-wing portion 716. The plurality of battery packs 200 may be connected to a bus 400 via a plurality of contactors 210. The solar panel 750 may be connected to the bus 400 via an MPPT 320. The power discharged by the plurality of battery packs 200 is utilized by each component included in the HAPS 700. For example, the power discharged by the plurality of battery packs 200 is utilized by a motor of the propeller 730. The motor of the propeller 730 may be an example of the load 500.

Inside the central part 720, a flight control unit 722, a communication controlling unit 724, and a management device 100 that is not shown are arranged. The flight control unit 722 controls the flight of the HAPS 700 by using the power discharged by the plurality of battery packs 200. The communication controlling unit 724 controls the communication of the HAPS 700 by using the power discharged by the plurality of battery packs 200.

The flight control unit 722 controls the flight of the HAPS 700 by controlling the rotation of the propeller 730, for example. Also, the flight control unit 722 may control the flight of the HAPS 700 by changing the angle of a flap or an elevator that are not shown. The flight control unit 722 may include various types of sensors such as a positioning sensor such as a GPS sensor, a gyro sensor, and an acceleration sensor to manage a position, a movement direction, and a movement speed of the HAPS 700.

The communication controlling unit 724 forms the communication area 704 on the ground by using an SL (Service Link) antenna. The communication controlling unit 724 forms a service link between the user terminal 30 on the ground by using the SL antenna. The SL antenna may be a multi-beam antenna. The communication area 704 may be a multi-cell.

The communication controlling unit 724 may form a feeder link between a gateway 40 on the ground by using an FL (Feeder Link) antenna. The communication controlling unit 724 may access a network 20 via the gateway 40.

The communication controlling unit 724 may communicate with a communication satellite 50 by using a satellite communication antenna. The communication controlling unit 724 may access the network 20 via the communication satellite 50 and a satellite communication station 60.

The user terminal 30 may be any communication terminal as long as it can communicate with the HAPS 700. For example, the user terminal 30 is a mobile phone such as a smartphone. The user terminal 30 may be a tablet terminal, a PC (Personal Computer), and the like. The user terminal 30 may also be a so-called IoT (Internet of Thing) device. The user terminal 30 may include anything that corresponds to a so-called IoE (Internet of Everything).

The HAPS 700 relays a communication between the network 20 and the user terminal 30, for example, via the feeder link or the communication satellite 50, and the service link. The HAPS 700 may provide a wireless communication service to the user terminal 30 by relaying the communication between the user terminal 30 and the network 20.

The network 20 includes a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation. The network 20 may include the Internet.

For example, the HAPS 700 transmits data received from the user terminal 30 in the communication area 704 to the network 20. In addition, for example, when the HAPS 700 receives data addressed to the user terminal 30 in the communication area 704, via the network 20, the HAPS 700 transmits the data to the user terminal 30.

The HAPS 700 maintains the communication area 704 in a specific area on the ground while circulating a predetermined flight path in the stratosphere, for example. The HAPS 700 maintains the flight in the stratosphere by storing power generated by the solar panel 750 in the daytime in the plurality of battery packs 200, and using the power of the plurality of battery packs 200 in the evening. The HAPS 700 maintains the flight in the stratosphere by raising itself and storing potential energy while charging the plurality of battery packs 200 in the daytime and operating the propeller 730 or the like by appropriately using the power in the battery pack 200 while gradually descending in the evening, for example.

The management device 800 manages a plurality of the HAPS 700. The management device 800 may communicate with the HAPS 700 via the network 20 and the gateway 40. The management device 800 may communicate with the HAPS 700 via the network 20, the satellite communication station 60, and the communication satellite 50.

The management device 800 controls the HAPS 700 by transmitting an instruction. The management device 800 may cause the HAPS 700 to circle over a target area such that the target area on the ground is covered by the communication area 704. For example, the HAPS 700 maintains the feeder link with the gateway 40 by adjusting a pointing direction of the FL antenna while flying in a circular orbit over the target area, and maintains the coverage of the target area by the communication area 704 by adjusting a pointing direction of the SL antenna.

The management unit 110 of the management device 100 manages, as described above, plurality of battery packs 200 to have the plurality of battery packs 200 being alternately discharged so that a voltage difference between a battery pack 200 with a highest voltage and a battery pack 200 with a lowest voltage among the plurality of battery packs 200 is not greater than a voltage threshold. In this way, as described above, the deterioration of the plurality of battery packs 200 can be reduced, and a period of time in which the HAPS 700 can maintain its flight in the stratosphere can be extended.

The management unit 110 may manage the HAPS 700 to be raised by the power generated by the solar panel 750 so that a charge rate at which the plurality of battery packs 200 are charged by the power generated by the solar panel 750 is not faster than a charge rate threshold. For example, the management unit 110 controls the power generated by the solar panel 750 to be supplied to the propeller 730, the flap and the elevator or the like, and the flight control unit 722 controls the propeller 730, the flap and the elevator so that the HAPS 700 is raised. By converting surplus power into potential energy, the surplus power can be utilized with no waste.

When a discharge rate of the battery pack 200 that is managed to be discharged among the plurality of battery packs 200 continues to be slower than a discharge rate threshold for a predetermined amount of time, the management unit 110 may manage the load 500 to be raised by the power of a battery pack 200 which is managed to be discharged. For example, the management unit 110 controls the power of the battery pack 200, which is managed to be discharged, to be supplied to the propeller 730, the flap and the elevator or the like, and the flight control unit 722 controls the propeller 730, the flap and the elevator so that the HAPS 700 is raised. By converting the power into potential energy while setting the discharge rate of the battery pack 200 which is managed to be discharged to a preferred discharge rate, the power can be utilized with no waste.

The management unit 110 may manage the plurality of battery packs 200 to have the plurality of battery packs 200 being alternately discharged so that a voltage difference between a battery pack 200 with a highest voltage and a battery pack 200 with a lowest voltage is not greater than a first voltage threshold during a time slot defined as daytime, and to have the plurality of battery packs 200 being alternately discharged so that a voltage difference between the battery pack 200 with a highest voltage and the battery pack 200 with a lowest voltage is not greater than a second voltage threshold that is greater than the first voltage threshold during a time slot defined as evening. The plurality of battery packs 200 are not charged by the solar panel 750 in the evening, so there is few problem even if the voltage difference between the battery pack 200 with a highest voltage and the battery pack 200 with a lowest voltage is greater than that of the daytime. By setting the voltage threshold used in the evening to the second voltage threshold greater than the first voltage threshold used in the daytime, the number of times of switching the battery pack 200 that is managed to be discharged can be reduced.

Figure 12:
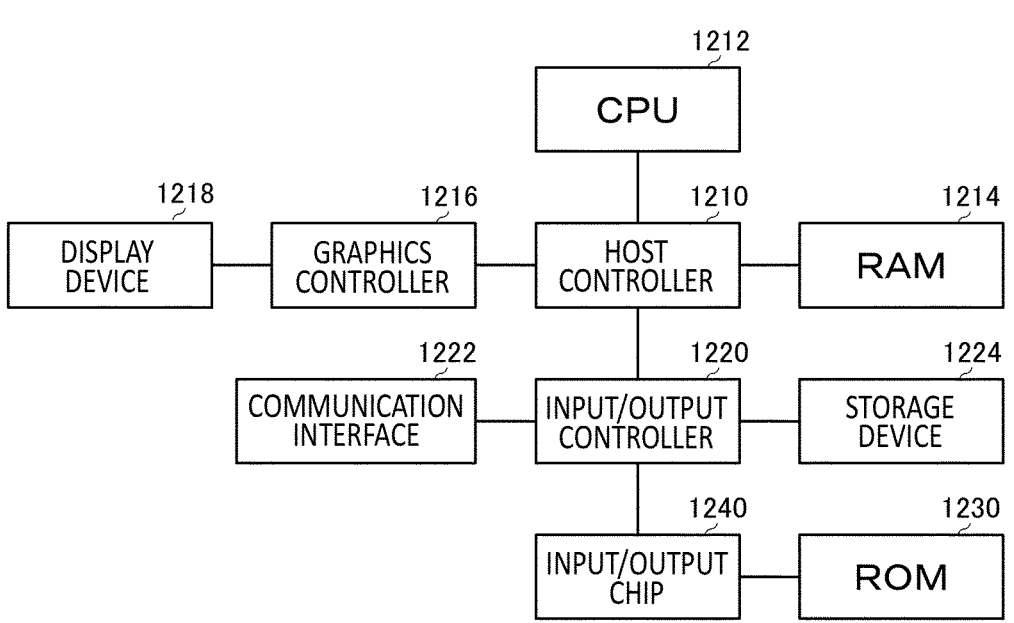
FIG. 12 schematically shows an example of a hardware configuration of a computer 1200 which functions as the management device 100.

FIG. 12 schematically shows an example of a hardware configuration of a computer 1200 which functions as the management device 100. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. An apparatus or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The program or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of apparatuses responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of computer-readable storage medium may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing apparatus locally or via a local area network (LAN), a wide area network (WAN) such as the Internet or the like in order that the general purpose computer, the special purpose computer, or the processor or the programmable circuitry of the other programmable data processing apparatus performs the computer-readable instruction to provide means for performing operations specified by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the above-described embodiments. It is apparent to persons skilled in the art that various alterations or improvements can be made to the above-described embodiments. It is apparent from the description of the claims that embodiments added with such alterations or improvements can also be included in the technical scope of the present invention.

It should be noted that the operations, procedures, steps, stages or the like of each process performed by an apparatus, system, program, and method shown in the scope of the claims, embodiments, or diagrams can be performed in any order as long as the order is not indicated by "prior to," "before," or the like and as long as the output from a previous process is not used in a later process. Even if the process flow is described by using phrases such as "first", "then" or the like in the scope of the claims, embodiments, or diagrams, it does not necessarily mean that the process must be performed in this order.

EXPLANATION OF REFERENCES 10 system
20 network 30 user terminal
40 gateway
50 communication satellite
60 satellite communication station
100 management device
110 management unit
112 pack-related information acquiring unit
114 estimation unit
200 battery pack
202 cell
210 contactor
220, 221, 222, 223, 224, 225, 226, 227, 228, 229, 230, 231, 232, 233, 234, 235, 236, 237 battery pack
300 power generation unit
310 solar cell
320 MPPT
400 bus
500 load
600 airplane
610 aircraft body
620 wing portion
622 left-wing portion
624 right-wing portion
630 propeller
700 HAPS
702 beam
704 communication area
710 aircraft body
712 wing portion
714 left-wing portion
716 right-wing portion
720 central part
722 flight control unit
724 communication controlling unit
730 propeller
740 pod
750 solar panel
800 management device
901, 902, 903, 904, 905 group
1200 computer
1210 host controller
1212 CPU
1214 RAM
1216 graphics controller
1218 display device
1220 input/output controller
1222 communication interface
1224 storage device
1230 ROM
1240 input/output chip.

What is claimed is:

1. A system comprising:
a management unit that manages a plurality of battery packs, which are connected in parallel to a bus to which a power generation unit and a load are connected, to have the plurality of battery packs being alternately discharged so that a voltage difference between a battery pack with a highest voltage and a battery pack with a lowest voltage among the plurality of battery packs is not greater than a voltage threshold, wherein the management unit controls a discharge rate of each of the plurality of battery packs that is being discharged such that the discharge rate of each of the plurality of battery packs that is being discharged is in the range of from 0.3C to 2.0C, and wherein the management unit controls a charge rate of each of the plurality of battery packs that is being charged such that the charge rate of each of the plurality of battery packs that is being charged is in the range of 0.3C or less.

2. The system according to claim 1, wherein when the plurality of battery packs are charged by power generated by the power generation unit, the management unit controls all of the plurality of battery packs to be electrically connected to the bus.

3. The system according to claim 2, wherein according to the management unit set in a mode where the plurality of battery packs are charged by power generated by the power generation unit, the management unit controls all of the plurality of battery packs to be electrically connected to the bus.

4. The system according to claim 3, wherein when the management unit is set in a mode where the plurality of battery packs are charged by power generated by the power generation unit, the management unit controls all of the plurality of battery packs to be electrically connected to the bus before a power generation performed by the power generation unit starts.

5. The system according to claim 1, wherein the management unit manages, immediately after a start of charging, voltage from the power generation unit to the bus to fall within a range between voltage of a battery pack with a highest voltage and voltage of a battery pack with a lowest voltage among the plurality of battery packs.

6. The system according to claim 5, wherein when any of the plurality of battery packs is charged by power generated by the power generation unit, the management unit manages, immediately after the start of charging, voltage from the power generation unit to the bus to fall within a range between voltage of a battery pack with a highest voltage and voltage of a battery pack with a lowest voltage among the plurality of battery packs.

7. The system according to claim 6, wherein
the power generation unit is connected to the bus via MPPT, and
when any of the plurality of battery packs is charged by power generated by the power generation unit, the management unit controls the MPPT, immediately after the start of charging, so that voltage from the power generation unit to the bus falls within a range between voltage of a battery pack with a highest voltage and voltage of a battery pack with a lowest voltage among the plurality of battery packs.

8. The system according to claim 1, wherein
the plurality of battery packs include a plurality of battery packs on a left side and a plurality of battery packs on a right side arranged in a horizontally symmetrical manner, and
the management unit manages the plurality of battery packs so that at least one of the plurality of battery packs on the left side and at least one of the plurality of battery packs on the right side are sequentially discharged.

9. The system according to claim 8, wherein the management unit manages the plurality of battery packs so that at least one of the plurality of battery packs on the left side and at least one of the plurality of battery packs on the right side are sequentially discharged in a horizontally symmetrical manner.

10. The system according to claim 1, wherein
the system is mounted in a flight vehicle,
the plurality of battery packs are arranged in a wing portion of the flight vehicle,
the power generation unit performs a solar power generation, and the load is a motor that rotates a propeller of the flight vehicle.

11. The system according to claim 10, comprising the flight vehicle.

12. The system according to claim 11, wherein the flight vehicle includes
a communication controlling unit that provides a wireless communication service to a user terminal in a communication area that is formed by irradiating a beam to a ground by using the power discharged by the plurality of battery packs.

13. The system according to claim 1, wherein when the management unit is switching from a discharging of one of the plurality of battery packs to a discharging of an alternate one of the plurality of battery packs, the management unit stops the discharging of the one of the plurality of battery packs after a time delay of from 0.01 to 1.00 second from the time the discharging of the alternate one of the plurality of battery packs is started.

14. The system according to claim 1, wherein the charge rate of each of the plurality of battery packs that is being charged is at least 0.05C.

15. A system comprising:
a management unit that manages a plurality of battery packs, which are connected in parallel to a bus to which a power generation unit and a load are connected, to have the plurality of battery packs being alternately discharged so that a voltage difference between a battery pack with a highest voltage and a battery pack with a lowest voltage among the plurality of battery packs is not greater than a voltage threshold; and
a flight vehicle, wherein the management unit, the plurality of battery packs, the bus, and the load are mounted in the flight vehicle,
wherein the power generation unit comprises one or more solar cells and the power generation unit performs a solar power generation,
wherein the load is a motor that rotates a propeller of the flight vehicle, and
wherein the management unit manages the plurality of battery packs to have the plurality of battery packs being alternately discharged so that a voltage difference between a battery pack with the voltage that is highest and a battery pack with the voltage that is lowest is not greater than a first voltage threshold during a time slot defined as daytime, and have the plurality of battery packs being alternately discharged so that the voltage difference between the battery pack with the voltage that is highest and the battery pack with the voltage that is lowest is not greater than a second voltage threshold that is greater than the first voltage threshold during a time slot defined as evening.

16. A non-transitory computer-readable storage medium having a program stored thereon, the program causes a computer to function as:
a management unit that manages a plurality of battery packs, which are connected in parallel to a bus to which a power generation unit and a load are connected, to have the plurality of battery packs being alternately discharged so that a voltage difference between a battery pack with a highest voltage and a battery pack with a lowest voltage among the plurality of battery packs is not greater than a voltage threshold, wherein the management unit controls a discharge rate of each of the plurality of battery packs that is being discharged such that the discharge rate of each of the plurality of battery packs that is being discharged is in the range of from 0.3C to 2.0C, and wherein the management unit controls a charge rate of each of the plurality of battery packs that is being charged such that the charge rate of each of the plurality of battery packs that is being charged is in the range of 0.3C or less.

17. A management method of a plurality of battery packs performed by a computer, the plurality of battery packs being connected in parallel to a bus to which a power generation unit and a load are connected, the method comprises:

managing the plurality of battery packs to have the plurality of battery packs being alternately discharged so that a voltage difference between a battery pack with a highest voltage and a battery pack with a lowest voltage among the plurality of battery packs is not greater than a voltage threshold;

managing a discharge rate of each of the plurality of battery packs that is being discharged such that the discharge rate of each of the plurality of battery packs that is being discharged is in the range of from 0.3C to 2.0C; and managing a charge rate of each of the plurality of battery packs that is being charged such that the charge rate of each of the plurality of battery packs that is being charged is in the range of 0.3C or less.

* * * * *